US006673293B1

(12) United States Patent
Mistopoulos et al.

(10) Patent No.: US 6,673,293 B1
(45) **Date of Patent: *Jan. 6, 2004**

(54) AUTOMATED SYSTEM AND METHOD FOR MANUFACTURING AN LED LIGHT STRIP HAVING AN INTEGRALLY FORMED CONNECTOR

(75) Inventors: James E. Mistopoulos, Saline, MI (US); Thomas L. Gustafson, Southfield, MI (US)

(73) Assignee: Cooper Technology Services, LLC, Findlay, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/478,393

(22) Filed: Jan. 6, 2000

Related U.S. Application Data

(62) Division of application No. 08/954,507, filed on Oct. 20, 1997, now Pat. No. 6,113,248.

(51) Int. Cl.[7] .............................................. B29C 47/02

(52) U.S. Cl. ............. 264/149; 264/272.15; 264/272.16; 264/171.11

(58) Field of Search ....................... 264/171.11, 272.15, 264/272.17, 1.29, 1.24, 1.7, 1.6, 272.16, 148, 149; 362/800

(56) References Cited

U.S. PATENT DOCUMENTS

| | | | | |
|---|---|---|---|---|
| 3,136,676 | A | | 6/1964 | Fisch et al. |
| 3,161,797 | A | | 12/1964 | Butler et al. |
| 3,305,745 | A | | 2/1967 | Clock et al. |
| 3,350,553 | A | | 10/1967 | Cline |
| 3,375,131 | A | | 3/1968 | Schmidt |
| 3,395,058 | A | | 7/1968 | Kennedy |
| 3,456,043 | A | | 7/1969 | Emery |
| 3,547,516 | A | | 12/1970 | Shanok et al. |
| 4,439,818 | A | | 3/1984 | Scheib |
| 4,597,033 | A | * | 6/1986 | Meggs et al. |
| 4,761,720 | A | | 8/1988 | Solow |
| 4,774,434 | A | | 9/1988 | Bennion |
| 4,774,642 | A | | 9/1988 | Janko et al. |
| 4,916,008 | A | | 4/1990 | Katayama et al. |
| 4,954,931 | A | | 9/1990 | Hassler, Jr. |

(List continued on next page.)

FOREIGN PATENT DOCUMENTS

| | | | |
|---|---|---|---|
| EP | 415372 | A2 | 3/1991 |
| GB | 1004601 | | 9/1965 |
| GB | 1383735 | | 2/1975 |
| GB | 2198286 | A | 4/1988 |
| GB | 2224343 | A | 2/1990 |
| JP | 63-39896 | | 3/1988 |
| JP | 63-57150 | | 4/1988 |
| JP | 1-150399 | | 10/1989 |
| JP | 2-27949 | | 2/1990 |
| JP | 2-133897 | | 11/1990 |

*Primary Examiner*—Mathieu D. Vargot
(74) *Attorney, Agent, or Firm*—Fay, Sharpe, Fagan, Minnich & McKee, LLP

(57) ABSTRACT

An integrally formed single piece light strip and light strip manufacturing system. The light strip also includes a substrate populated with a plurality of LED light circuits. A plurality of bus elements are spaced apart from one another at a predetermined distance and are in electrical communication with the plurality of light circuits. A plastic material is extruded around the plurality of light circuits and the substrate to completely encapsulates the bus elements and the plurality of light circuits to provide a protective housing. In one embodiment, an electrical connector is also integrally formed as part of the light strip to eliminate the need for separate connectors. The light strip is o manufactured in a cost efficient manner, and is impervious to moisture penetration, thereby allowing the strip to be used in a variety of applications and environments.

15 Claims, 5 Drawing Sheets

U.S. PATENT DOCUMENTS

| | | | | | |
|---|---|---|---|---|---|
| 4,956,031 | A | | 9/1990 | Mori et al. | |
| 4,975,814 | A | | 12/1990 | Schairer | |
| 4,999,755 | A | | 3/1991 | Lin | |
| 5,032,960 | A | | 7/1991 | Katoh | |
| 5,059,373 | A | * | 10/1991 | Hirabayashi | 264/272.15 |
| 5,107,408 | A | | 4/1992 | Vernondier | |
| 5,130,909 | A | * | 7/1992 | Gross | 362/800 |
| 5,155,669 | A | | 10/1992 | Yamuro | |
| 5,162,696 | A | | 11/1992 | Goodrich | |
| 5,193,895 | A | | 3/1993 | Naruke et al. | |
| 5,222,799 | A | | 6/1993 | Sears et al. | |
| 5,321,593 | A | | 6/1994 | Moates | |
| 5,336,345 | A | * | 8/1994 | Gustafson et al. | |
| 5,337,225 | A | | 8/1994 | Brookman | |
| 5,371,657 | A | | 12/1994 | Wiscombe | |
| 5,375,044 | A | | 12/1994 | Guritz | |
| 5,404,282 | A | | 4/1995 | Klinke et al. | |
| 5,450,301 | A | | 9/1995 | Waltz et al. | |
| 5,490,049 | A | | 2/1996 | Montalan et al. | |
| 5,496,427 | A | | 3/1996 | Gustafson et al. | |
| 5,519,596 | A | | 5/1996 | Woolverton | |
| 5,559,681 | A | | 9/1996 | Duarte | |
| 5,661,374 | A | | 8/1997 | Cassidy et al. | |
| 5,848,837 | A | * | 12/1998 | Gustafson | 362/800 |
| 5,851,455 | A | * | 12/1998 | Sehr et al. | 264/171.11 |
| 5,927,845 | A | * | 7/1999 | Gustafson et al. | 362/800 |
| 5,986,581 | A | * | 11/1999 | Magdaleno, II et al. | |

* cited by examiner

FIG. 7.
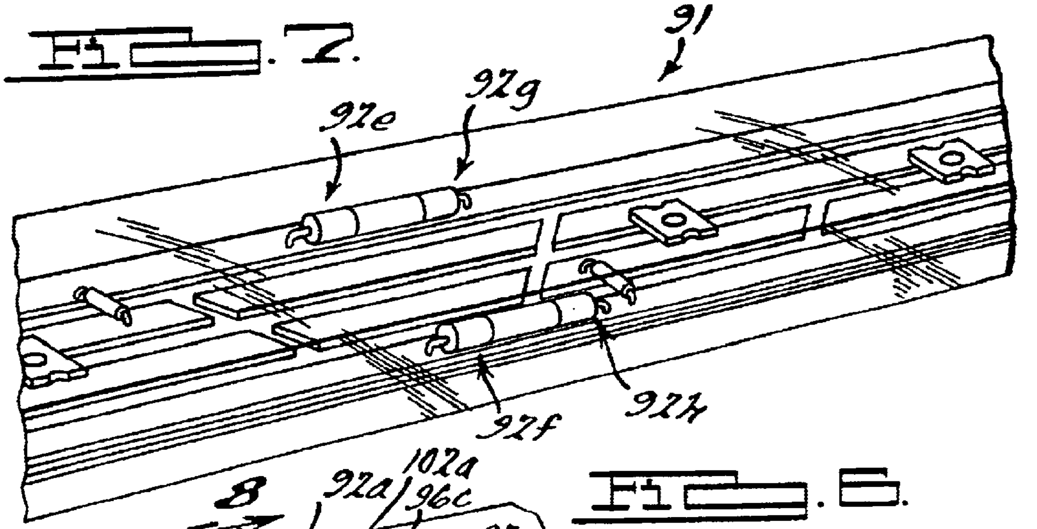
FIG. 6.
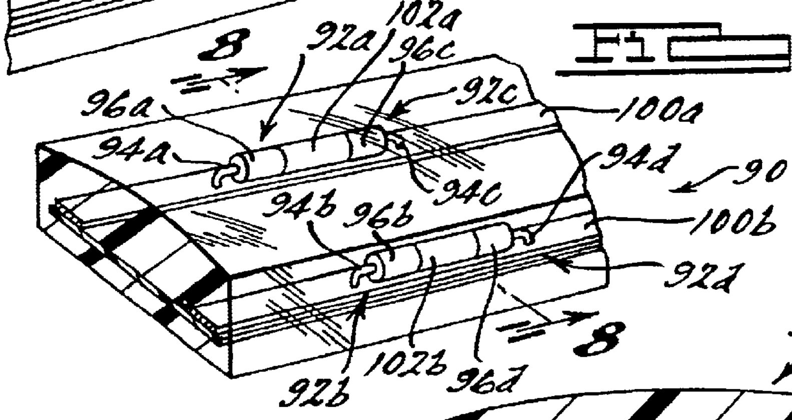
FIG. 8.
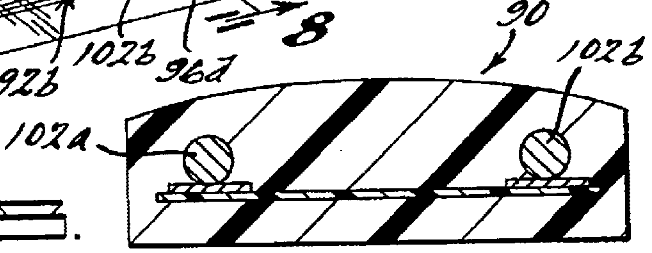
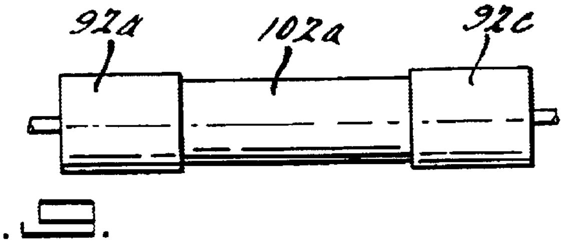
FIG. 9.
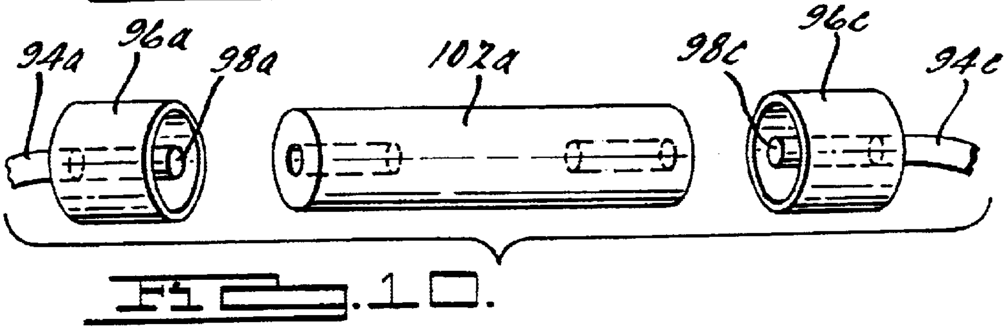
FIG. 10.

FIG. 11.
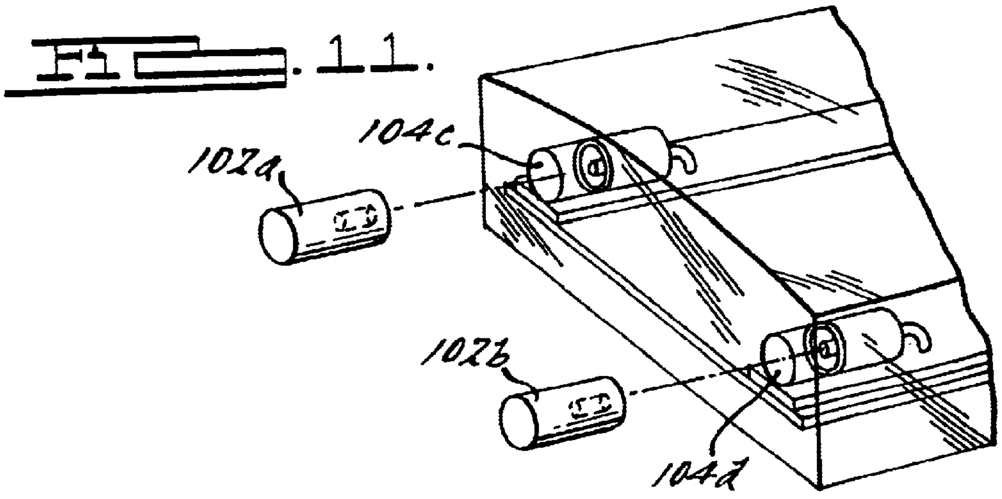
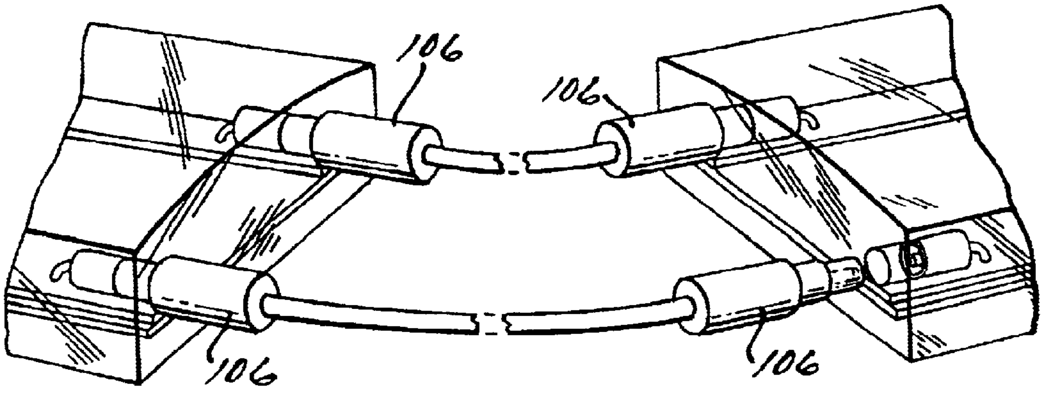
FIG. 12.
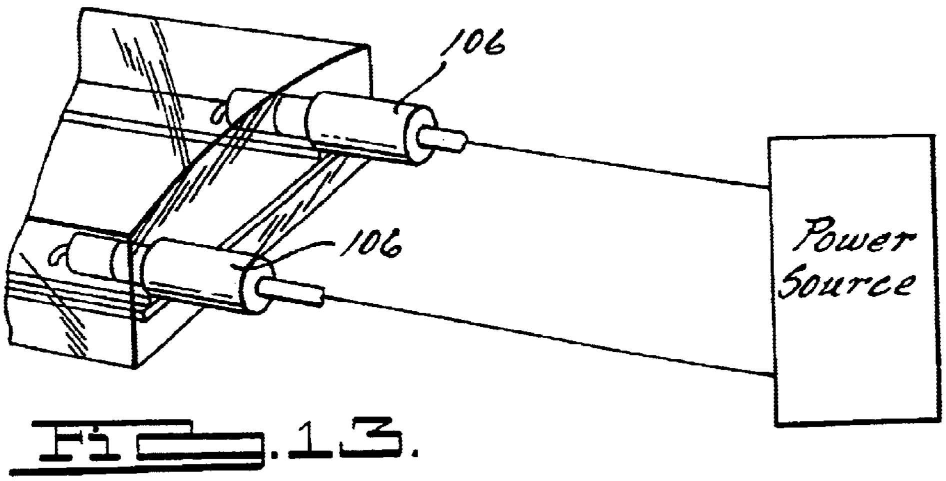
FIG. 13.

AUTOMATED SYSTEM AND METHOD FOR MANUFACTURING AN LED LIGHT STRIP HAVING AN INTEGRALLY FORMED CONNECTOR

This is a division of U.S. patent application Ser. No. 08/954,507, filed Oct. 20, 1997, now U.S. Pat. No. 6,113, 248.

BACKGROUND OF THE INVENTION

The present invention relates generally to light strips and, more particularly, to a system and method for manufacturing a continuous light strip with light emitting diodes that minimizes manufacturing costs and that includes built-in manufacturing flexibility to produce a light strip with a configuration tailored to specific customer parameters.

Light emitting diode (LED) light strips provide usual markings in dimly lit environments. LED light strips are relatively inexpensive, easy to install, and exhibit long life when compared to similar bulb or lamp based markers.

Regardless of the light strip application, it is imperative that the LED and associated circuitry housed within the strip is protected from damage due to excessive loads placed on the strip and from exposure to moisture ingress. However, many conventional LED light strips include circuitry housed within hollow tube-like sheathings which provide only minimal protection against mechanical damage to the circuitry due to excessive loads placed on the sheathings. Also, as the tube-like sheathings are hollow, the LED strips are typically susceptible to damage caused by moisture penetration. As a result, such light strips are often not desirable for outdoor lighting applications or other applications in which the strips are exposed to extreme weather conditions or abuse.

Another conventional light strip includes a multi-layer electroluminescent (EL) lamp configuration sealed through a conventional sheet or hard lamination process. In this hard lamination process, a top layer of protective film is either adhesively bonded or thermally fused to a bottom layer of protective film through the use of high temperatures and high pressure rollers to sandwich the EL lamp configuration between the layers. Such an EL light strip provides a more permanent type of protective sheathing than the above mentioned tube-like sheathing associated with other conventional EL light strips, and provides a more effective moisture barrier.

However, moisture is often capable of penetrating into the interior of these two-piece EL light strips through the fused or bonded seal joining the two-piece housing, especially when the strips are used in outdoor applications, or after the bonded or fused seal connecting the two-piece housing weakens over time. In addition, the hard lamination process used to seal the EL lamp configuration is not desirable for LED circuitry, as LEDs are typically greater in height than the substantially flat layers forming the EL lamp configuration. High pressure rollers typically used to bond or fuse the two-piece housing could crush the protruding LEDs during formation of the strip. In addition, the high temperatures required for the bonding or fusing of the strip would subject the LEDs and associated circuitry to heat damage.

In response to the aforementioned limitations associated with conventional light strips, integral LED light strips formed through a continuous extrusion process have been developed. Such integrally formed strips are single-piece strips that have no internal voids, and thereby provide a high degree of protection against damage due to loads placed on the strips and are highly resistant to moisture ingress. Examples of such integrally formed strips are disclosed in pending U.S. patent application Ser. No. 08/520,237 entitled "Integrally Formed Linear Light Strip With Light Emitting Diodes" assigned to StanTech, of Dearborn, Mich., and in pending U.S. patent application Ser. No. 08/707,212 entitled "Integrally Formed Linear Light Strip with Light Emitting Diodes," also assigned to StanTech.

While the above mentioned integrally formed LED light strips exhibit desirable characteristics, there is still a need for further improvement in the art. In particular, there is a need to provide a programmable LED light strip manufacturing system and method whose parameters may be varied according to particular light strip requirements. There is also a need for an LED light strip that requires no circuitry preassembly, thereby minimizing manufacturing costs through automation of the LED circuit assembly process. There is also a need for an LED light strip in which light strip connectors are also integrally formed with discrete segments of the light strip itself, thereby minimizing overall system cost and the need for external commercial light strip connectors. Further, there is a need for an integrally formed LED light strip that includes fully encapsulated LED circuitry connected to a substrate that exhibits superior bonding characteristics with the extruded light strip housing, thereby providing a high degree of protection from moisture ingress and thereby increasing the functional life of the strip itself.

SUMMARY OF THE INVENTION

Accordingly, the present invention provides a continuously and integrally formed single piece light strip having no internal voids that allows a continuous length of substrate populated with LED light circuits to be fed into an extruder that encapsulates the substrate and circuits thereon. The light strip of the present invention is assembled through a computer-controlled method and system that has control parameters that may be easily changed to tailor the features of the manufactured light strip to the particular design parameters of a customer. The LED light strip requires no circuit preassembly, thereby minimizing manufacturing costs through automation of the LED circuit assembly process. The present invention also provides an LED light strip including light strip connectors integrally formed with the light strip itself, thereby minimizing overall system cost and the need for external commercial light strip connectors. In addition, the present invention provides an integrally formed LED light strip that includes a continuous plurality of LED circuits connected to a substrate that exhibits superior bonding characteristics with the continuously extruded and protective housing, and thereby provides a high degree of protection from moisture ingress, thereby increasing the functional life of the strip itself.

In particular, the present invention relates to a continuously and integrally formed single-piece light strip that includes a substrate having a plurality of populated light circuits. A plurality of bus elements spaced apart from one another at a predetermined distance are adhered to the substrate and are in electrical communication with the plurality of light circuits. A continuously extruded plastic material completely encapsulates the bus elements and the plurality of light circuits to form a protective housing over the bus elements and the light circuits.

The present invention also relates to a system for forming the above integral light strip. The system includes a circuit supply subsystem that supplies a continuous length of populated light circuits. The system also includes an extrusion subsystem that receives the continuous length of populated light circuits from the circuit supply subsystem and that extrudes a protective thermoplastic housing over the continuous length of populated light circuits.

These and other various advantages and features of the present invention will become apparent from the following description and claims, in conjunction with the appended drawings.

BRIEF DESCRIPTION OF THE DRAWINGS

FIG. 4 is a diagram of the system used to manufacture the light strip shown in FIG. 1;

FIG. 5 is a side elevational view of a light strip accumulator utilized in the system shown in FIG. 4;

FIG. 6 is a perspective view illustrating a light strip according to a second preferred embodiment of the present invention;

FIG. 7 is a perspective view illustrating a light strip according to a third preferred embodiment of the present invention;

FIG. 8 is a cross-sectional view of the light strip of FIG. 6 taken along line 8—8;

FIG. 9 is a side elevational view of the electrical connectors and the connector plug shown in FIG. 6;

FIG. 10 is an exploded view of the connectors of the light strip shown in FIG. 6;

FIG. 11 is a perspective view of a portion of the light strip of FIG. 6 after the strip has been segmented into two strips;

FIG. 12 shows both portions of the segmented light strip of FIG. 11 interconnected by an electrical connector;

FIG. 13 shows one portion of the segmented light strip of FIG. 10 connected to a power source;

DETAILED DESCRIPTION OF THE PREFERRED EMBODIMENTS

Figure 1:
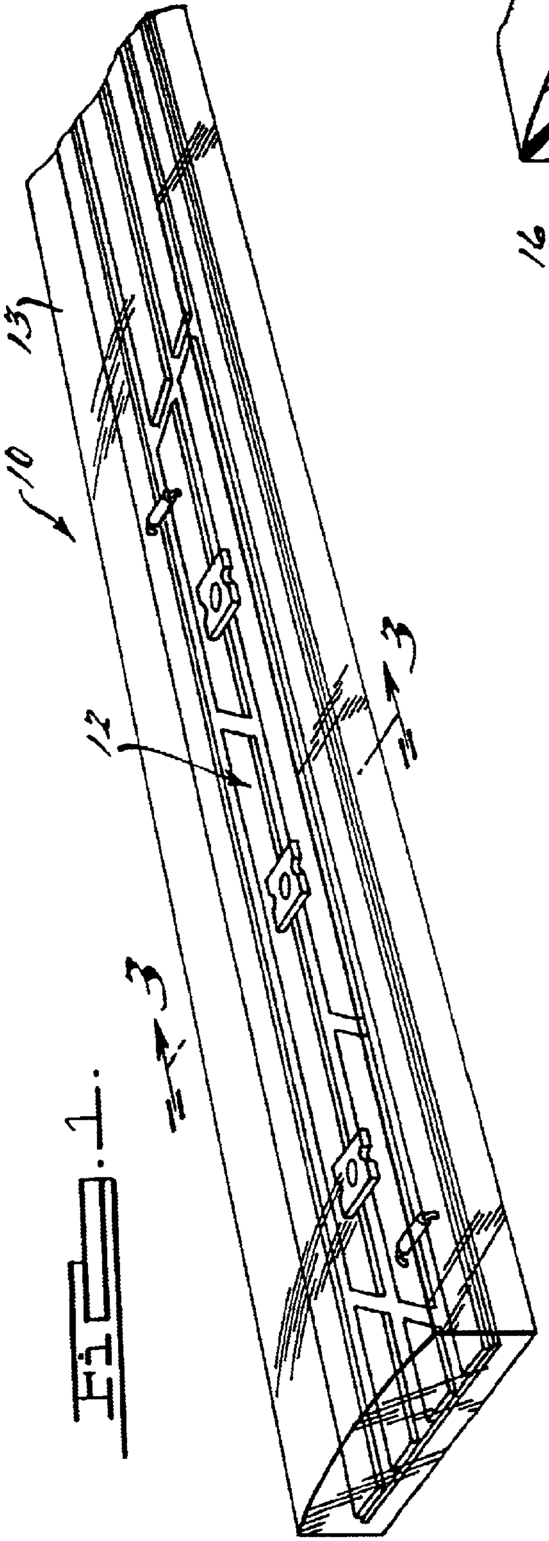
FIG. 1 is a perspective view illustrating a light strip according to a first preferred embodiment of the present invention.

Referring to FIG. 1, a continuously formed linear LED light strip according to a preferred embodiment of the present invention is shown generally at 10. The light strip includes LED circuitry, shown generally at 12, encapsulated within an integral single-piece extruded thermoplastic housing 13 having no internal voids. The thermoplastic housing 13 is preferably composed of a low vapor transmission rate polymeric material such as Surlyn®, an ionomer resin, a high density polyethylene, polychlorotrifluoroethylene, a polyester, or polyvinylchloride. By being extruded over the circuitry 12 so that no internal voids are formed within the strip, the extruded thermoplastic housing protects the LED circuitry 12 from damage caused from heavy loads being placed on the strip and from moisture penetration. As will be described in more detail below, the strip 10 may be of varying lengths, may house one of many numerous configurations and numbers of LED circuits and may be interconnected to other discrete strip segments, according to particular application parameters.

Figure 2:
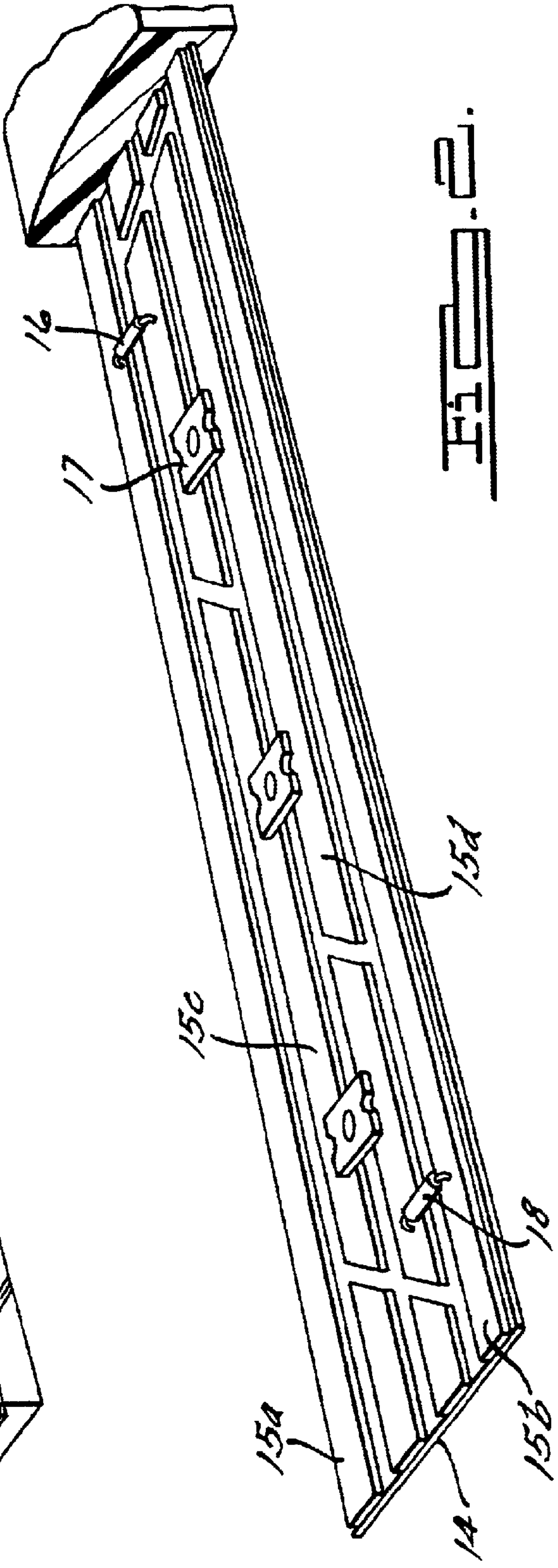
FIG. 2 shows circuit components and associated substrate encapsulated within the strip housing shown in FIG. 1.
Figure 2:
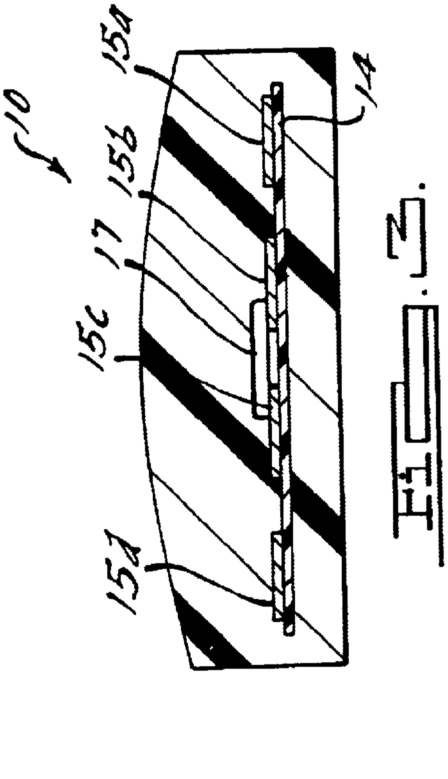

FIG. 2 illustrates the light strip shown in FIG. 1, with the housing partially cut away to reveal the encapsulated LED circuitry 12. As shown, the LED circuitry 12 is mounted on a substrate 14 through a manufacturing process discussed below. Preferably, the substrate is a film composed preferably of a low vapor transmission rate polymeric material such as Surlyn®, an ionomer resin, a high density polyethylene, polychlorotrifluoroethylene, a polyester, or polyvinylchloride or any other material that is capable of integrating with the housing. Preferably, the substrate material matches that of the thermoplastic housing to ensure that the substrate adheres to the housing by melting into the housing, thereby minimizing the chance that the substrate will separate from the thermoplastic housing material over time. The light strip also includes continuous bus elements 15*a*, 15*b* that extend longitudinally through the length of the strip.

Conductive bus elements 15*c*, 15*d* also extend longitudinally through the length of the strip between the elements 15*a*, 15*b*. However, the conductive bus elements 15*c*, 15*d* are cut into discontinuous segments. Resistors, such as the resistor 24, light emitting diodes, such as the LED 17, and an electrical connector 18 are operatively connected between one of the bus elements 15*a*, 15*b* and one of the bus elements 15*c*, 15*d* as shown to form an electrical circuit. The resistor may have a value of, for example, 51 ohms, and the light emitting diode is preferably a Hewlett-Packard Model HPWA-MLOO for use with an AC/DC controlled power source. However, resistors of any value and any of numerous LED types may be used to realize the system depending upon the desired input voltage and drive current. The LEDs and the resistors are connected to the bus elements 15*a*–15*d* such that when electricity is supplied to the strip over the bus elements, from a remote power source (FIG. 13), the LEDs are illuminated in a continuous, pulsating, or chase-effect manner, or in any other manner defined by the needs of a specific application.

Figure 3:
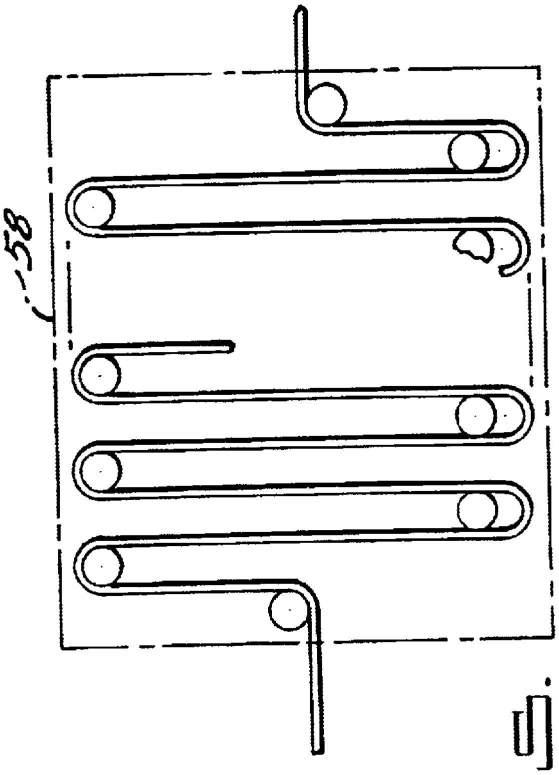
FIG. 3 is a cross-sectional view of the strip shown in FIG. 1 taken through line 3—3.
Figure 1:
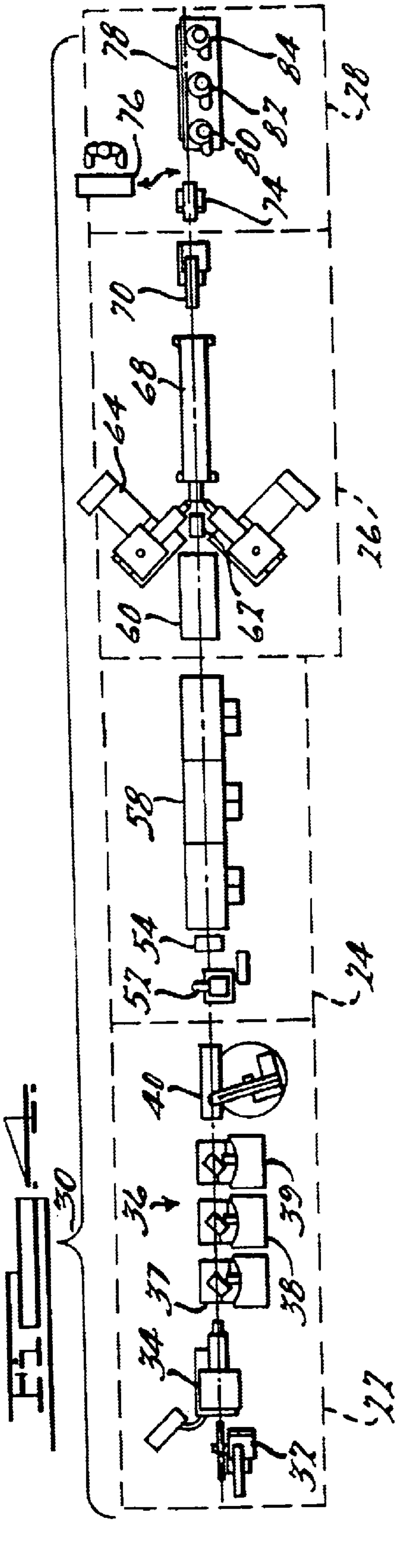

Referring to FIG. 3, a cross-sectional view of the light strip 10 is shown. According to one embodiment of the present invention, the light strip is substantially rectangular in shape and approximately 0.4 inches in height and 1.25 inches in width. However, these dimensions may vary according to a particular application.

FIG. 4 illustrates a top plan view of a multi-station system 30 for manufacturing a light strip shown in FIG. 1. The system 30 consists of four main sub-systems: A circuit assembly sub-system 22, a quality control sub-system 24, an extrusion sub-system 26, and a control and packaging sub-system 28. The specific components of each of the sub-systems will be described now in detail.

Referring to the circuit assembly subsystem 22, the sub-system 22 includes a first station 32, which consists of a coil of the metal bus elements 15*a*–15*d* laminated to the substrate 14. Typically, the coil is provided in 300-foot sections for ease of dispensing the coil into the system 30. A second station 34 is located adjacent the first station 32 and comprises a laser soldering sub-system. The second station operates to butt solder coils of metallic bus elements dispensed from first station 32 so that a continuous length of metal conductors is provided to the third station 36. The third station 36 is a programmable progressive die station capable of punching or piercing holes within the metallic bus elements, and segmenting bus elements 15$c$, 15$d$ to produce a desired circuit from the metallic bus elements. In particular, the third station 36 comprises three robots 37, 38, 39 programmed to perform particular piercing or cutting functions. The first robot 37 marks the bus elements 15$a$–15$d$ at a point at which the elements are to be separated so that the LED light strip may be cut into discrete segments by the control and packaging subsystem. The second robot 38 is programmed to pierce the middle bus elements 15$c$ and 15$d$ to form the desired circuit configuration in the LED strip. The third robot 39 punches holes in the bus elements 15$a$–15$d$ in locations in which the LEDs and resistors are to be placed and electrically connected thereto by the fourth station 40. The fourth station 40 is a programmable pick and place station that includes a supply of the LEDs, the resistors, and the electrical connectors. The station 40 is programmed to place the circuit components at the desired locations on the bus elements and electrically connect the components to the bus elements. Preferably, the station 40 includes a soldering mechanism to solder the components in place on the bus elements once the components are connected thereto.

Referring now to the quality control sub-system 24, a fifth station 52 comprises a robotic vision inspector for ensuring that the light strip circuitry meets predetermined quality control standards before being fed to the extruder sub-system 26. The inspector is programmed with instructions to test certain circuit parameters such as current draw, operational status of each LED connected to the circuit, and circuit breaks in the LED circuitry. The station can also be programmed with any particular instructions for quality control parameters in accordance with customer requirements and electrical specifications. Adjacent the sub-station 52 is a repair station 54. The repair station works in connection with the quality control station to correct any quality control problems detected by the station 52. For example, the repair station 54 is preferably a robot, which includes soldering capabilities for fixing LED circuitry breaks, loose circuitry component connections, and the like.

Upon leaving the repair station 54, the LED circuitry is fed into an accumulator 58, which is shown in more detail in FIG. 5. As shown, the accumulator is a mechanism that holds the assembled LED circuitry connected to a substrate 16 in a manner that allows the substrate and circuitry to accumulate. The accumulator allows the portion of the circuitry being fed through the assembly sub-system 22 and quality control sub-system 24 to be inspected and repaired without affecting the rate at which the circuitry is fed from the repair station 54 into the extruder sub-system 26 and the control and packaging sub-system 28. The accumulator 58 maintains a predetermined amount of tension on the assembled circuitry to keep the circuitry and substrate from becoming entangled as it gathers in the accumulator.

Once the circuitry leaves the accumulator 58, it is fed to the extrusion subsystem, and more particularly to a preheating mechanism 60 which includes equipment that dries the circuitry and substrate. The circuitry and substrate are dried to remove moisture prior to the components and substrate being encapsulated in the thermoplastic housing, and also to preheat the metal bus elements 15$a$–15$d$ to facilitate better adhesion of the metal bus elements with the extruded thermoplastic housing. After being heated, the assembly is fed through a pre-guide station 62, which keeps the assembled components aligned as the components are fed to the extruder station 64. The extruder station 64 consists of a configuration of extruders, of the type well known in the art, for extruding the thermoplastic housing over the circuit assembly, dies, and additional extrusion related components.

Adjacent the extruder station 64 is a water tank 68 for cooling the newly formed integral LED light strip. A puller 70 is located downstream and adjacent to the water tank 68 for maintaining tension on the newly formed light strip. The puller is programmed to pull the strip at a rate dictated by the speed settings of the other components in the system.

Referring now to the control and packaging sub-system 28, a programmable inline cut-off machine 74 is located adjacent to and downstream from the puller 70. The cut-off machine includes vision capabilities such as infrared sensors, that provide a final inspection of the strip. The vision capabilities allow the machine to check the cross-section parameters of the part, such as height and width, to insure that the light strip has been properly formed. The cutoff machine is connected to the extruder via a communication link to relay the quality control information and allow the extruder to make any necessary adjustments. All of the programmable components are controlled by a processor 76, which is preferably a personal computer with an Intel® Pentium® processor and a Windows-based operator interface. Preferably, the controller is programmed via visual BASIC or C-programming language to control all system operation.

The machine 74 is also programmed to visually locate the point at which the light strip is to be cut into discrete segments as marked by the first robot 37. Alternatively, if the light strip is formed along with its own connector, as will be described below, the machine may cut the light strip after it "sees" the connector. Finally, an automatic coiler/packager 78 is located at the end of the assembly line to continuously accumulate a predetermined length of the LED light strip. The packager 78 winds the lengths of light strip around coils 80, 82, 84 in successive order as will be described below.

In operation, the combination substrate/bus element configuration is fed from the coil 32 to the laser soldering station 34, where discontinuous lengths of the substrate/metal bus element configurations are butt soldered together to form a single continuous length. The continuous length is then fed to the programmable progressive die station 36 where the robots 37–39 perform the above mentioned cutting and punching functions. The configured substrate/bus element combination is then fed into the programmable pick and place station 40 where circuit components, including LEDs, resistors, and jumpers are placed and adhered in predetermined locations to the bus element/substrate configuration. Once the components are secured in place, the assembled configuration is fed through the robotic vision inspector 52 which detects quality control problems with the assembled configuration. The repair station 54 then makes any appropriate adjustments in response to detected quality control problems at the inspector 52. The correctly configured and operative light strip circuit configuration is then fed into the accumulator 58.

Subsequently, the light strip is pulled from the accumulator at a constant rate and into the preheating mechanism 60 for circuit and substrate heating and drying purposes as described above. After being heated, the light strip is fed into the extrusion station 64, where the configuration is encapsulated within the thermoplastic housing in a manner which leaves no internal voids. After the configuration is encapsulated, the newly formed light strip is cooled in water station 68 and pulled from the water station by the puller 70. The programmable inline cut-off machine 74 then cuts the formed light strip into discrete segments in accordance with program parameters, and the predetermined segment lengths are wound and packaged by the automatic coiler/packager 78. As a predetermined length is wound on one of the coils, such as coil 80, the packager switches to an adjacent coil, such as the coil 82, and the strip is wound on the adjacent coil up to the predetermined length as the length is removed from the first coil.

Referring to FIGS. 6 and 7, second and third embodiments of the light strip according to the present invention are shown generally at 90 and 91. The light strip 90 includes bus elements 100*a*, 10*b*. The light strip 91 includes LEDs and LED circuitry similar in configuration to the light strip 10. However, both light strips 90, 91 also include electrical connectors 92*a*–92*d* and 92*e*–92*h*, respectively, which are integrally formed with the light strip such that additional commercially available electrical connectors are not required to be heat staked or otherwise connected to the ends of each length of light strip. This feature minimizes system cost and improves system reliability when several discrete lengths of light strip are electrically interconnected. For purposes of further discussion, reference will be made to the light strip 90, with the understanding that the connectors in the light strip 91 are identical in structure and function to the connectors in the light strip 90.

As shown in FIG. 6, the electrical connectors 92*a*–92*d* each include a conductive element 94*a*–94*d*, respectively. The conductive elements 94*a*, 94*c* are electrically bonded or otherwise connected to the bus element 100*a*, and the conductive elements 94*b*,94*d* are electrically bonded or otherwise connected to the bus element 100*b*. The conductive elements 94*a*–94*d* each extend upwardly from the bus elements into a connector housing 96*a*–96*d*, respectively, to form electrical connector pins such as the connector pins 98*a*, 98*c* in connector housings 96*a*, 96*c* shown in FIG. 10, therein.

As shown in FIGS. 6 and 9, electrical connector 92*a* is attached to electrical connector 92*c* through a connector plug 102*a*. Similarly, electrical connector 94*b* is connected to electrical connector 94*d* through a connector plug 102*b*. The connector plugs are formed from a material, such as nylon or polyester, that is easily separable from the substrate and extruded housing material, and the connector pins over which the connector plug is extruded. As shown in FIGS. 10 and 11, when the formed strip is cut into two discrete segments, the connector plugs 102*a*, 102*b* may be removed to define male connector sockets such as the sockets 104*c*, 104*d* on each of the strip segments adjacent the connector housings. The male connector sockets are configured to receive conventional female connectors, as shown at 106 in FIGS. 12 and 13, that may be standard banana clips or socket plugs, and that may be used to connect the light strip to another light strip or to a power source 110.

Figure 14:
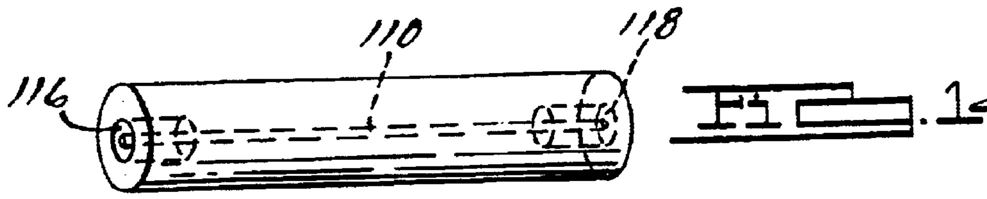
FIG. 14 is a side elevational view of a connector plug associated with the light strip connectors of FIG. 6 and FIG. 7 according to an alternate embodiment of the present invention.

At this point, it should be appreciated that the connector plugs are non-conductive and, once the strip is cut, the plugs are separated into two discrete segments and are no longer used for further strip connection purposes. However, the connector plugs may alternatively be formed with a conductive element or elements that extend through the length of the plugs as shown at 110 in FIG. 14. As is shown in FIG. 14, when a light strip is cut near or adjacent the connector housings, both ends of the plug 110 define female sockets 116, 118 into which the light strip connector pins fit in electrical contact with the conductive element 110. The connector plug can then be used to electrically couple adjacent strip sections.

The strip segment 90 is manufactured in a manner similar to that used for the strip 10 described above. However, the electrical connectors are placed on the strip substrate in combination with the connector plugs, and the conductive elements bonded to the appropriate bus element, at the circuit assembly subsystem 22 before the housing is extruded over the substrate by the extruder sub-system. After passing through the extruder station, the electrical connector and connector plug are integrally encapsulated with the strip. The strip may then be separated into discrete segments at the control and packaging subsystem and the connector plugs removed. Alternatively, the strip could be cut in the field at the connector plug. This feature represents an improvement over prior art light strips, as the strip segments and corresponding connector plugs facilitate easy connector fabrication and on-site strip installation.

Figure 15:
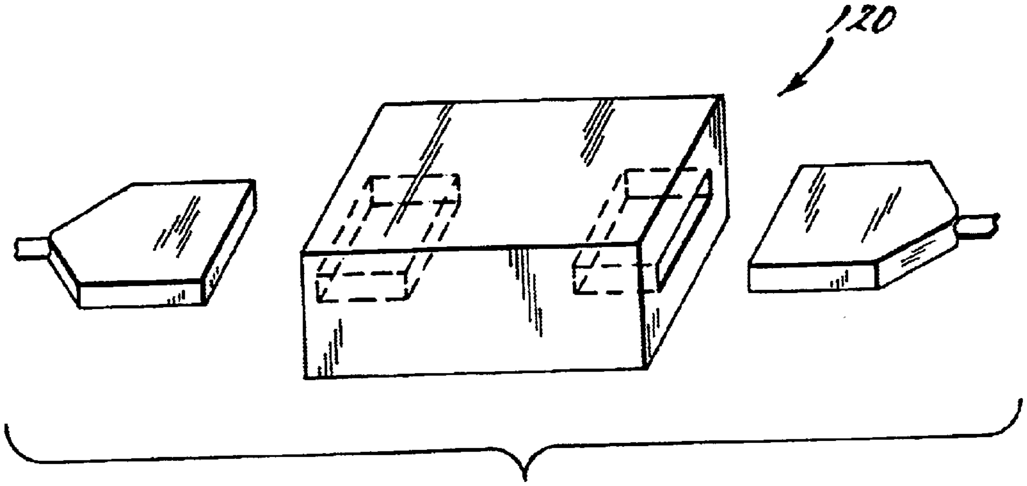
FIGS. 15–17 illustrates alternate embodiments of a light strip of the present invention formed with integral electrical connectors.
Figure 16:
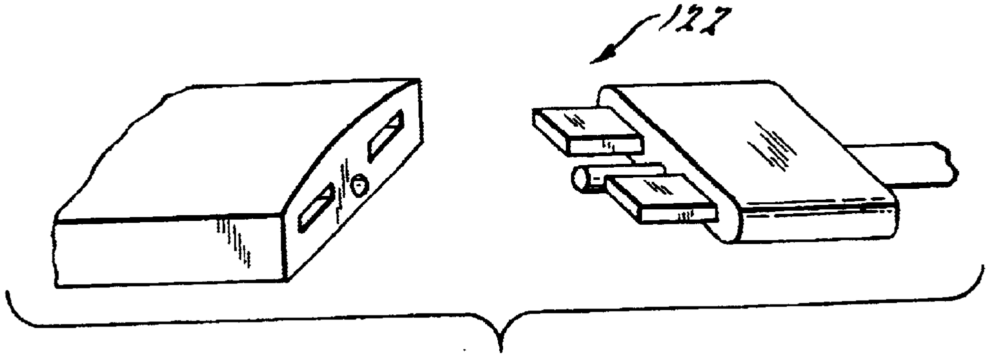
Figure 17:
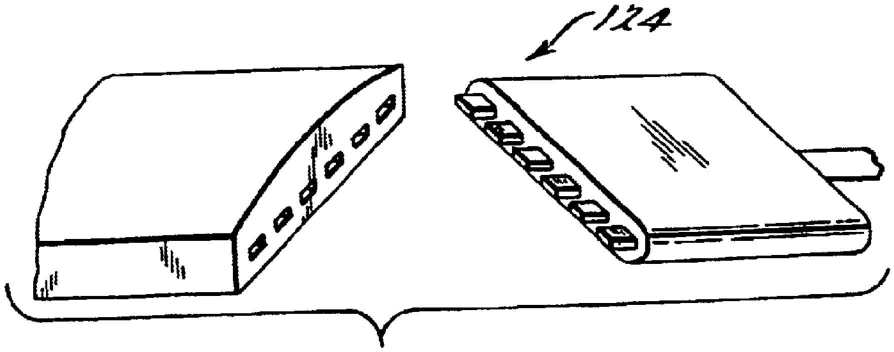

It should be appreciated that the connector plugs of the above described light strip embodiment may be formed in numerous shapes and sizes. As a result, male connector sockets may be formed to accommodate any number of different female connectors, such as the substantially rectangular connector configuration 120 shown in FIG. 15, a standard double socket connector configuration 122 shown in FIG. 16, or the multiple wire/cable connector configuration shown at 124 in FIG. 17. If necessary, the bus elements of the strip exposed on the end of a segmented strip can be sealed to insure proper electrical strip insulation.

Upon reading the foregoing description, it should be appreciated that the light strip of the present invention is manufactured by a multi-station system whose parameters may be varied to form a light strip as required by a particular application. The light strip manufactured by the system requires little or no circuit preassembly, thereby minimizing manufacturing costs. Light strip circuit parameters may be changed according to a particular application or need without the need for retooling or reconfiguring the strip assembly line system. In addition, the system may be configured to form an LED light strip in which the light strip connectors may be formed integrally with the strip, thereby minimizing the need for external, and typically more expensive, light strip connectors for interconnecting light strips or for connecting a light strip to a power source. The light strip of the present invention is also formed out of materials that exhibit superior bonding characteristics, thereby insuring that the capsulated LED circuitry is bonded to the circuit substrate and to the light strip housing to provide a high degree of protection from moisture ingress and to thereby increase the functional life of the strip itself.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A method of forming an integral LED light strip, comprising:

supplying to an extruder a continuous length of assembled LED light circuits affixed to a substrate; and continuously extruding a thermoplastic material around the continuous length of assembled LED light circuits and the substrate to form a continuous voidless protective light circuit housing that shields the LED light circuits from moisture.

2. The method of claim 1, further comprising the step of cutting the continuous protective light circuit housing between adjacent LED light circuits to form a plurality of discrete LED light strip segments.

3. The method of claim 1, wherein the step of continuously extruding comprises continuously extruding a thermoplastic material that is identical to the substrate so that the substrate becomes integrated with the extruded thermoplastic material.

4. A method of forming an integral light strip, comprising:

supplying to an extruder a continuous length of assembled light circuits affixed to a thermoplastic substrate; and continuously extruding a material that includes the same thermoplastic as the substrate around the continuous length of assembled light circuits and the substrate to form a continuous voidless protective light circuit housing that shields the light circuits from moisture.

5. The method of claim 4, further comprising the step of cutting the continuous protective light circuit housing between adjacent light circuits to form a plurality of discrete light strip segments.

6. The method of claim 4, wherein the supplying step includes supplying assembled LED light circuits.

7. The method of claim 4, wherein the supplying step includes selecting the thermoplastic material from the group consisting essentially of Surlyn®, an ionomer resin, a high density polyethylene, polychlorotrifluoroethylene, polyester, and polyvinylchloride.

8. The method of claim 4, wherein the supplying step includes the step of providing a light circuit having first and second bus elements spaced apart from one another at a predetermined distance and adhered to the substrate.

9. The method of claim 8, wherein the providing step further includes the step of locating third and fourth bus elements between the first and second bus elements and adhered to the substrate.

10. The method of claim 9, wherein the supplying step includes the step of electrically connecting between corresponding segments of the second and third bus elements.

11. The method of claim 9, wherein the supplying step includes the step of completing an electrical current flowpath between the first, second, third and fourth bus elements and the light circuits.

12. The method of claim 4, wherein the supplying step includes the step of repeating the light circuits and electrically connecting same to one another to form a light strip system.

13. The method of claim 4, wherein the supplying step includes the step of integrally forming an electrical connector in each of the light circuits and interconnecting the light circuits together.

14. The method of claim 13, wherein the integrally forming step includes the step of providing a plurality of connector plugs each corresponding to one of the electrical connectors.

15. The method of claim 14, further comprising the step of cutting the continuous protective light circuit housing between adjacent light circuits to form a plurality of discrete light strip segments, and removing the plurality of connector plugs subsequent to the cutting step to define a plurality of electrical sockets within the strip segments.

* * * * *